United States Patent
Meissner et al.

(10) Patent No.: US 6,587,488 B1
(45) Date of Patent: Jul. 1, 2003

(54) CONTROL OF PARASITIC LASER OSCILLATIONS IN SOLID-STATE LASERS BY FRUSTRATING TOTAL INTERNAL REFLECTIONS

(75) Inventors: Helmuth E. Meissner, Pleasanton, CA (US); Scott C. Mitchell, Tracy, CA (US)

(73) Assignee: Maxios Laser Corporation, Livermore, CA (US)

( * ) Notice: Subject to any disclaimer, the term of this patent is extended or adjusted under 35 U.S.C. 154(b) by 104 days.

(21) Appl. No.: 09/709,060

(22) Filed: Nov. 8, 2000

(51) Int. Cl.$^7$ ................................................ H01S 3/13
(52) U.S. Cl. ...................................... 372/29.01; 372/75
(58) Field of Search ................................ 372/29.01, 75

(56) References Cited

U.S. PATENT DOCUMENTS

| | | | | |
|---|---|---|---|---|
| 5,084,888 A | * | 1/1992 | Tajima et al. | 372/39 |
| 5,091,915 A | * | 2/1992 | Tatsumi et al. | 372/75 |
| 5,237,434 A | * | 8/1993 | Feldman et al. | 359/19 |
| 5,436,759 A | * | 7/1995 | Dijaili et al. | 359/333 |
| 5,608,745 A | * | 3/1997 | Hall et al. | 372/26 |
| 5,926,494 A | | 7/1999 | Pepper | 372/70 |
| 5,936,984 A | * | 8/1999 | Meissner et al. | 372/34 |
| 6,061,377 A | * | 5/2000 | Brassart et al. | 372/66 |
| 6,356,693 B1 | * | 3/2002 | Shimizu et al. | 385/131 |

FOREIGN PATENT DOCUMENTS

WO     WO 00/27000     5/2000

* cited by examiner

*Primary Examiner*—Paul Ip
*Assistant Examiner*—Leith Al-Nazer
(74) *Attorney, Agent, or Firm*—John P. Wooldridge

(57) ABSTRACT

Parasitic oscillations are eliminated in solid-state laser components by applying a pattern of grooves to the peripheral sections that do not transmit the desired laser radiation. Additionally, the invention frustrates total internal reflections at polished peripheral component walls by providing a pattern of roughened surface sections in between polished sections. The roughened surfaces may be only microns deep or may be as deep as a few centimeters for large components. The grooves should be sufficiently deep as to inhibit any total internal reflections. The invention applies to all common solid-state architectures that are designed with polished surfaces that do not serve to propagate the desired laser radiation. Examples are slabs, plates, laser rods, waveguides and disks functioning as laser oscillators or amplifiers. The invention is operational with conventional crystal or glass laser hosts or with hosts that are composites of same, similar or dissimilar crystals or glasses.

27 Claims, 4 Drawing Sheets

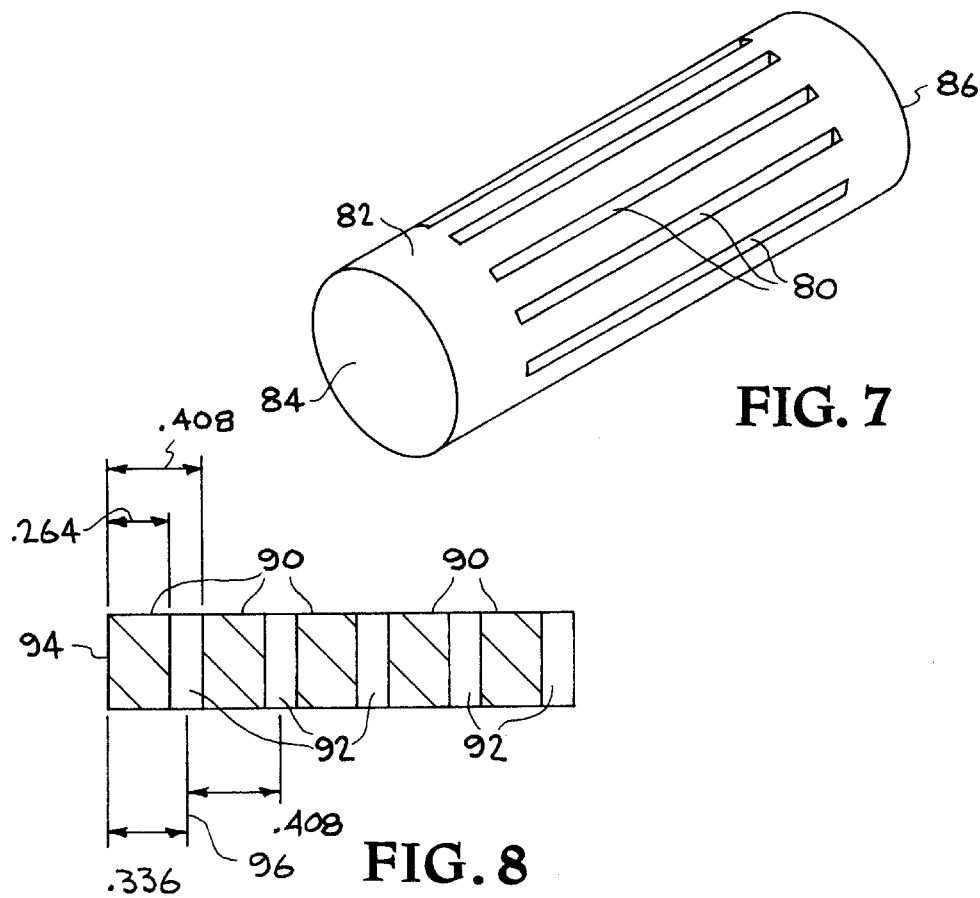
FIG. 7
FIG. 8
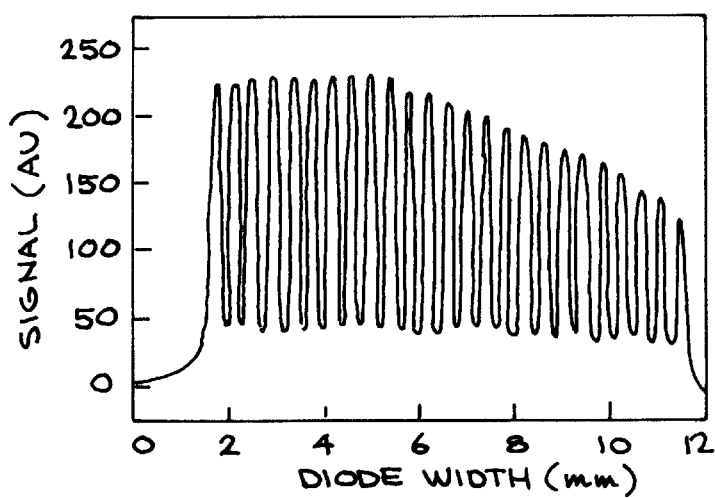
FIG. 9

CONTROL OF PARASITIC LASER OSCILLATIONS IN SOLID-STATE LASERS BY FRUSTRATING TOTAL INTERNAL REFLECTIONS

BACKGROUND OF THE INVENTION

1. Field of the Invention

The present invention relates to improvements in solid-state laser technology, and more specifically, it relates to means for controlling and eliminating parasitic oscillations in solid-state lasers.

2. Description of Related Art

Parasitics reduce the efficiency of a solid-state laser system by establishing undesirable and uncontrolled paths of laser oscillations that extract energy from the system. They are a consequence of internal reflections at surfaces of a laser medium at angles of incidence that are not intended for laser oscillation by the designer. If these stray rays can close their path and reflect into themselves, parasitic lasing will occur as soon as the gain in the laser medium exceeds the reflective losses (Koechner, Solid-state Laser Engineering).

There are a number of methods in the prior art that are all partially successful in reducing parasitic oscillations. Internal reflections can be avoided by roughening surfaces. If, however, pump light is to be introduced through a roughened surface, the pump efficiency is greatly reduced by scattering of pump light. This solution to the problem of parasitics appears to be most effective for flashlamp pumped systems where efficiency is not an important consideration, while diode laser pumped media would usually be pumped through polished surfaces.

Wedged or canted surfaces on rods and slabs can be designed to reduce parasitics due to internal reflections on polished surfaces. While this method provides a partially satisfactory solution, it rarely eliminates parasitics completely because it is difficult to design angled surfaces that will not allow any stray laser radiation to find a closed path within the lasing medium.

Rods with grooves have been successfully employed to drastically reduce parasitics. Especially whispering gallery modes that propagate circumferentially can be essentially eliminated at the expense of reduced efficiency when side pumping with laser diode bars.

Rods and slabs with undoped ends of a variety of flange designs have provided some protection from parasitics because they will reduce the number of possible closed paths and also reduce the gain of longitudinal modes.

Disk or plate amplifiers are designed for high average power operation, and suppression of parasitics has been the subject of numerous investigations. Bulk and surface parasitic modes have been identified as principal mechanisms of siphoning energy away from the intended laser action. The most common and most effective means of controlling parasitics occurring in the bulk of the medium is by attaching absorptive edge claddings to amplifier plates. This approach suffers from the thermal non-uniformities and stress that are generated by the heat of absorption in the cladding. Claddings tend to delaminate from the lasing medium, resulting in catastrophic systems failure. Another important disadvantage is that it usually is not possible to optically pump through the cladding layer because it often also absorbs pump radiation. In that case, amplifier disks have to be face pumped. Surface modes of single-pass amplified spontaneous emission are enabled by the higher gain coefficient at the surface due to pump light absorption, and represent the principal loss mechanism of large, edge-clad disks.

A means to reduce the gain of parasitic oscillations in laser slabs is to affix laser-inactive host medium to, e.g., the sides and/or end faces. This technique is partially successful, especially when it is combined with wedged surfaces, but will also not be able to prevent parasitics at high power densities since it is virtually impossible to prevent all closed paths of stray laser radiation. Similarly, antireflective coatings have a beneficial effect in reducing total internal reflections but again not at all angles of incidence.

A special case of a disk-type lasing medium where parasitics are difficult to suppress with the prior art are planar waveguide geometries that suffer from total internal reflections when their side surfaces are polished. Wedging the side surfaces is only partially effective in suppressing closed-path parasitics since, by the very nature of the waveguide design, more stray rays are reflected back into the lasing core layer than if the refractive index of the lasing and cladding layers were closely matched. Using absorptive side claddings such as dopants of $Sm^{3+}$, $Cr^{3+}$, $Cr^{4+}$ and $Co^{2+}$ in YAG, for lasing planar waveguides of Yb or Nd:YAG/YAG/sapphire usually is not possible when side pumping these structures because the pump light would also be absorbed by the absorptive layer.

Another method of avoiding parasitics claims that generating absorbing regions inside of a gain medium by spatially sectioning it into pumped and unpumped regions (U.S. Pat. No. 5,926,494, titled "Laser Systems With Improved Performance And Reduced Parasitics And Method" by D. M. Pepper). While this approach is claimed to be applicable to systems with 3-level lasing ions and to be scalable to high powers, it again appears to suffer from absorption in some parts of the lasing medium and limited applicability.

None of the teachings of the prior art enable the elimination of parasitics by a simple and generally applicable method that still allows side pumping through polished surfaces without any absorption or thermal effects. The present invention overcomes the limitations of the prior art without being complicated or requiring the production of expensive structures.

SUMMARY OF THE INVENTION

It is an object of the present invention to reduce or eliminate parasitic oscillations in all known embodiments of solid-state laser amplifiers and oscillators.

Other objects will be apparent to those skilled in the art based on the teachings herein.

The preceding and other shortcomings of the prior art are addressed and overcome by the present invention which consists of applying a pattern of grooves onto a polished surface where the spacing between grooves is large enough to allow the pump light from individual diodes of a diode bar to pump the lasing medium without any impediment such as absorptive cladding layers or a roughened surface. The depth of the grooves may vary from of the order of microns only, up to centimeters, depending on the laser architecture and the designed power output The polished surface may have an antireflective coating deposited for even better pump efficiency.

The present invention is practiced by providing a pattern of grooves that have depths and spacings between grooves so that total internal reflections are substantially eliminated. These grooves usually are perpendicular to the polished surfaces where TIR is to be frustrated but, depending on the specific laser architecture, grooves may form angles other than 90° with these surfaces.

Another embodiment of the present invention provides undoped cladding layers of a thickness that corresponds to at least the depth of the groove required to frustrate total internal reflections of a lasing medium of given refractive index. In this way, the volume of the lasing medium is not affected by the groove pattern.

An embodiment of the invention was designed around a DILAS manufactured laser diode array. The width of the diode array was measured. The laser diode array emitter and isolation spacings are provided. In the diode array used in this example, there are 25 emitters. The cross sectional outputs of two Dilas laser diode arrays are shown. The output does appear to be uniform across the width of the diode. A design is provided that will control parasitic modes for a laser diode array having the Dilas emitter and isolation spacing. This example illustrates the design considerations applicable to other laser configurations. Examples of other laser mediums to which this design is directly applicable include a zig-zag slab laser with undoped side claddings and a diode-pumped rod laser.

An embodiment is described of an Nd:YAG rod that includes evenly spaced grooves that run the length of the rod. Alternately, the grooves may encircle the rod perpendicular to the length of the rod. Still another embodiment may include a crosshatched groove pattern to prevent parasitic oscillations from arising longitudinally and transversely. The grooves are designed to have a spacing that will allow a maximum reflected angle that is less than the critical angle. The grooves are shown as having a rectangular shape; however, other shapes such as v-shaped grooves and cylindrical grooves are usable in this configuration as well. The sides of the grooves may be made diffuse to further prevent parasitic oscillations. A higher refractive index cladding layer may be applied between the grooves to trap stray radiation. A pattern of absorbing species may be in between the grooves, either within the lasing medium itself, or in a cladding that is located on the area adjacent to the groove pattern.

A description is provided of an embodiment of the present invention that utilizes a generally tapered rod having a doped central rod portion 90 and undoped end caps. The use of undoped, flanged endcaps has proven useful in limiting the maximum length of the ray path that can be trapped in the laser rod.

An embodiment of a laser diode pumped zig-zag slab laser is described. The slab includes the groove architecture of the present invention and may further include grooves that traverse the slab perpendicular to its length. The present invention is also embodied in a microchip laser. The microchip laser includes the groove architecture of the present invention and may further include grooves that traverse the slab perpendicular to its length.

BRIEF DESCRIPTION OF THE DRAWINGS

FIG. 7 illustrates a groove pattern that is effective in essentially eliminating circumferential parasitic modes in a rod laser.

FIG. 8 shows laser diode array emitter and isolation spacings.

FIGS. 9 and 10 show the cross sections of two Dilas laser diode arrays.

DETAILED DESCRIPTION OF THE INVENTION

Figure 1:
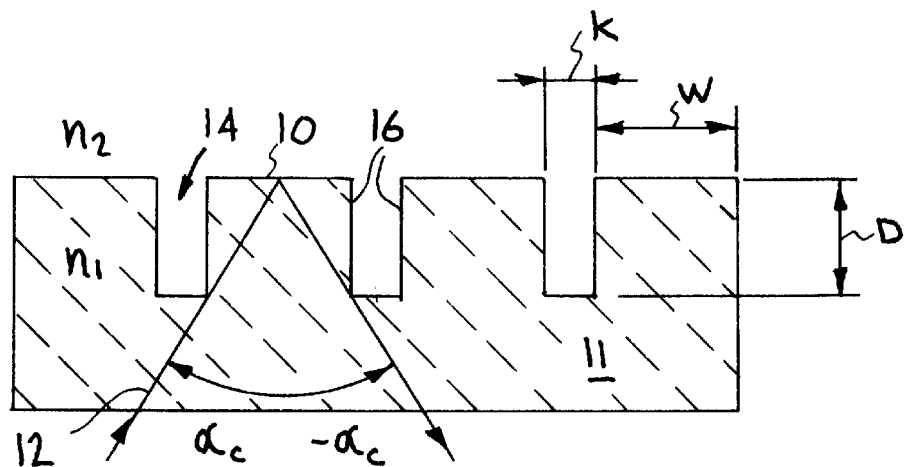
FIG. 1 illustrates the relationship between $n_1$, $n_2$, $\alpha_c$, K, W and D.

Total internal reflection occurs when a ray propagating in a material of higher refractive index $n_1$ encounters a polished boundary surface to a lower index medium $n_2$ at an incident angle that is equal or greater to the surface normal than a critical angle $\alpha_c = \arcsin(n_2/n_1)$. If the boundary is smooth and clean, essentially 100% of the energy is redirected along the totally reflected ray. The present invention enables the frustration of total internal reflections by placing grooves of depth D, and kerf width K at spacings W between grooves such that the angle of incidence is smaller than $\alpha_c$. An example of the relationship between $n_1$, $n_2$, $\alpha_c$, K, W and D is illustrated in FIG. 1.

The critical angle $\alpha_c$ is a constant for a design that involves a transparent solid medium of a known refractive index $n_1$ and a surrounding medium of a known refractive index $n_2$. The dimensions of K, W and D may be varied to accommodate pump modules and other constraints of the laser component As shown in FIG. 1, the polished surface 10 of lasing medium 11 will not support total internal reflection of beam 12 when the angle of incidence is larger than $\alpha_c$ because the grooves 14 will prevent it. Angles that are smaller than $\alpha_c$ will have a reflected and a transmitted ray component. The invention is not restricted to preventing total internal reflection, but is also capable of limiting reflecting beams to specific angles below a given maximum angle. The grooves can be shaped as shown in FIG. 1, with rough scattering surfaces 16 perpendicular to the polished surface, especially when diode pump lasers or diode pump laser bars are placed opposite to them for introducing pump light into the laser component. FIG. 1 makes it apparent that the polished boundary surface does not need to be planar but can also be operational as nonplanar grooved surface, e.g., cylindrical as for a laser rods or circular as for a laser disk. The present invention is usable in all of the embodiments described in U.S. patent application Ser. No. 09/184,913, titled "Laser-Pumped Compound Waveguide Lasers And Amplifiers", by Helmuth Meissner et al., incorporated herein by reference and in WO 00/27000, titled "Solid-state Lasers With Isotropic Lasing Media For Generating Linearly Polarized Output", by Helmuth Meissner et al., also incorporated herein by referenced.

Figure 2:
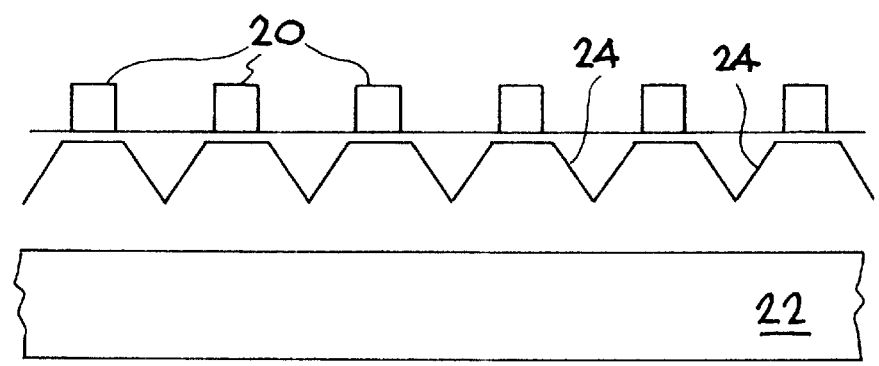
FIG. 2 shows a schematic drawing where an array of diode pump sources is aligned opposite to a polished, antireflection-coated component surface.

Another useful geometry includes grooves that approximate a V-shape with various opening angles, and grooves with parallel sidewalls that deviate from the surface normal. FIG. 2 shows a schematic drawing where an array of diode pump sources 20 are aligned opposite to a polished, antireflection-coated component surface. The laser component 22 can represent a section of an amplifier disk that has an undoped edge cladding attached to its lasing medium. The grooves 24 are V-shaped with an opening angle that allows essentially all the divergent pump radiation to enter the disk through the undoped edge cladding without scattering at the groove surfaces. The design of the grooves is governed by the following considerations: Refractive index of the laser component (resulting in the angle where total internal reflection at the component surface occurs), dimensions of the pump source and depth and opening angle of the V-grooves.

Figure 3:
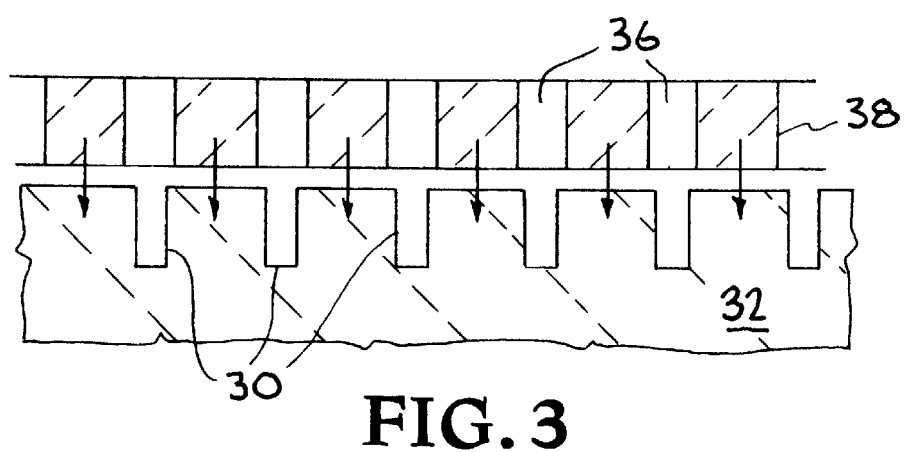
FIG. 3 depicts the grooves in a waveguide surface that have been cut with a kerf width such that they line up with the isolation spacings between diodes.

Parasitic oscillations readily occur in the plane of planar waveguide lasers. To determine a suitable design of the groove pattern, the spacing between the individual diodes of a diode bar is measured by imaging its output onto a CCD camera. The grooves 30 in the waveguide 32 surface are then cut with a kerf width such that they line up with the isolation spacings 36 between diodes 38 as shown in FIG. 3. This procedure has been performed experimentally for a number of commercially available 20 W laser diode bars but is applicable to diode bars of higher output power as well. A Nd:YAG waveguide component that is proximity-side-pumped with 2 each of 20 W diode bars will actually not lase without a groove pattern to interrupt parasitic oscillations, while an output power of 10 W has been observed with grooves according to the present invention.

Figure 4:
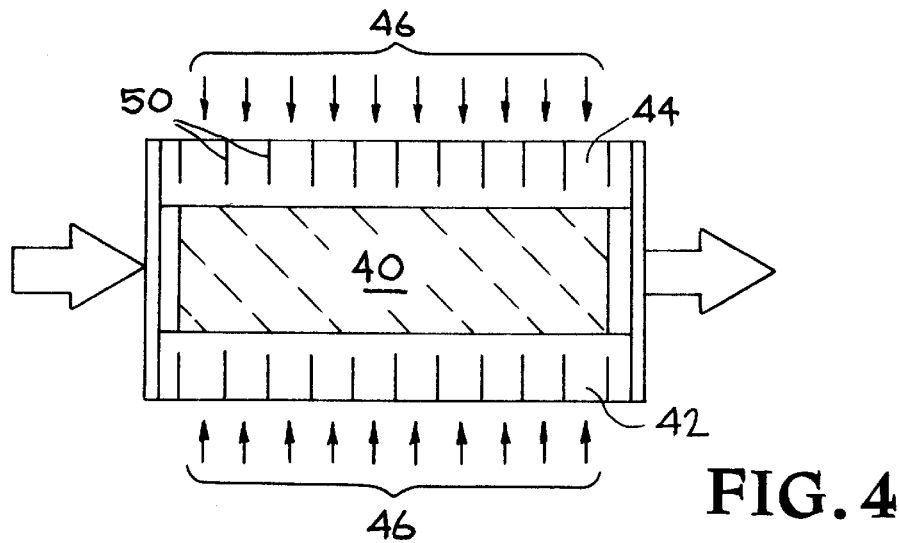
FIG. 4 provides an example of a planar waveguide laser.

Another example of a planar waveguide laser is shown in FIG. 4. The waveguide laser consists of a 6 $\mu$m thick core layer 40 that is a compound structure formed by adhesive-free bonding of a lasing medium of 10% Yb:YAG surrounded on 3 sides with undoped YAG and on the fourth side with $Cr^{4+}$:YAG as saturable absorber for passive q-switching operation. There is a layer 42, 44 of undoped YAG of 5 $\mu$m thickness on both sides of the core. Both of these are employed for cladding pumping with pump radiation 46 entering from the sides of the waveguide. In addition, there is an outer cladding layer of sapphire on each side of the inner YAG layers. As shown in FIG. 1, a pattern of grooves 50 is designed that frustrates total internal reflections and at the same allows pump light to penetrate through the polished side surfaces. The grooves have been fabricated with a dicing saw and have a kerf width of 0.1 mm. The grooves according to the present invention enable lasing operation without interference of parasitics. If there is lasing at all observed without grooves, the parasitics bleach the saturable absorber and it does not function properly as a passive q-switch according to its designed performance.

It is seen from FIG. 4 that a pattern can be designed according to the present invention that essentially eliminates total internal reflections in laser slab components. These slabs may be conventional straight-through slabs, zig-zag slabs with Brewster angles or compound slabs with undoped side claddings and undoped ends. The slab includes the groove architecture of the present invention and may further include grooves that traverse the slab perpendicular to its length. Still another embodiment may include a cross-hatched groove pattern to prevent parasitic oscillations from arising longitudinally and transversely. Grooves are designed to have a spacing that will allow a maximum reflected angle that is less than the critical angle. The grooves are shown as having a rectangular shape; however, other shapes such as v-shaped grooves and cylindrical grooves are usable in this configuration as well. The sides of the grooves may be made diffuse to further prevent parasitic oscillations. A higher refractive index cladding layer may be applied between the grooves to trap stray radiation. A pattern of absorbing species may be in between the grooves, either within the lasing medium itself, or in a cladding that is located on the area outside of the rod between each groove. For a Nd:YAG slab, Yb:YAG may be used as an absorbing species. By applying a higher refractive index cladding layer between the grooves, stray radiation will not be subject to TIR and will be trapped.

The present invention is applicable to the Nd:YAG/sapphire slab shown in FIGS. 23A–B of WO 00/27000, which demonstrate schematically the applicability of the present invention to compound laser slab configurations as another commonly employed geometry of solid-state lasers. FIG. 23A illustrates a compound zig-zag slab lasing with linearly polarized output It consists of a central compound Yb:YAG component 230, with two undoped YAG ends 232 that are adhesive-free attached to it with techniques described therein. The YAG compound in turn is sandwiched between two sapphire sides 234 that cause the YAG to behave as a quasi-birefringent material. FIG. 23B is a similar zig-zag slab with Brewster angles, except that Nd:YAG 236 is the lasing medium that develops stress birefringence due to two sapphire layers 238 that are bonded to it as shown.

Figure 5:
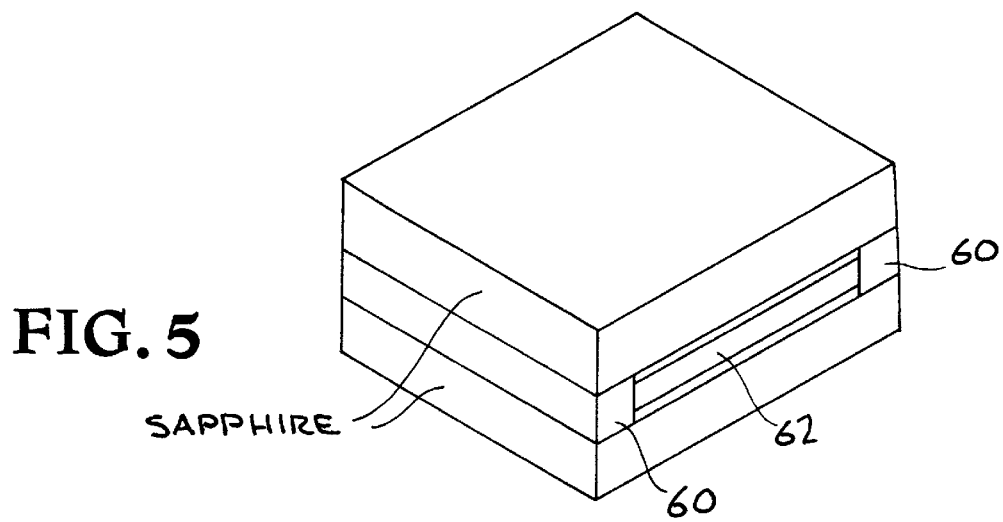
FIG. 5 illustrates the use of a roughened area to avoid parasitics.

FIG. 5 illustrates an alternative to FIG. 4 for avoiding parasitics by providing a loss of approximately 20% or more on the sides of a waveguide laser by a roughened area. In FIG. 5, the loss area 60 can be at the sides of the waveguide beyond the area that is used for side-pumping the waveguide. By way of example, the length of the guiding layer 62 consisting of Nd:YAG or Yb:YAG and the inner cladding layers consisting of undoped YAG is extended by undoped YAG on both sides. This extended area is then roughened by applying a single shallow groove or roughened surface or by a series of grooves, as long as the resulting loss is approximately about 20% on the sides. This alternative has the advantage that there is no groove pattern in the central section of the sides, and the pattern does not depend on the diode spacing that varies with diode laser manufacturer. Instead of using undoped extensions, at least one saturable absorptive extension may be employed in the case of a passively q-switched waveguide laser.

Figure 6:
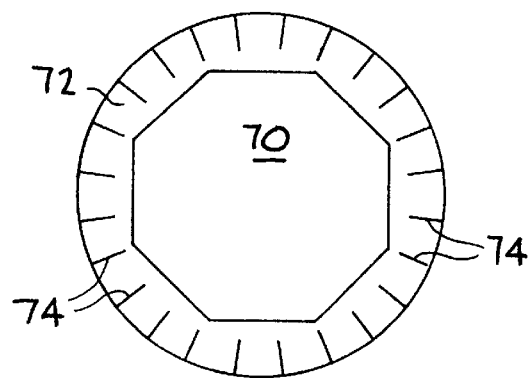
FIG. 6 provides an example of a disk laser.

The performance of disk lasers benefits greatly from the present invention. An example of a disk laser is shown in FIG. 6. A doped central octagonal core 70, comprising e.g., Yb:YAG, is surrounded by an undoped host medium 72, comprising e.g., undoped YAG. Grooves 74 are cut into the undoped YAG in a pattern that is designed to essentially eliminate total internal reflections thereby preventing the depletion of the gain medium, and enabling higher laser output power than without the grooves.

FIG. 7 illustrates a groove pattern 80 that is effective in essentially eliminating circumferential parasitic modes in a rod laser 82 while at the same time enabling side pumping through the polished barrel of the laser rod with banks of laser diode bars. To facilitate sealing the coolant into the laser cavity with O-rings, the grooves are preferably not cut from end face 84 to end face 86 but terminate a constant distance before that. Not only will this pattern allow sealing coolant into the cavity but also will produce a rod that effectively has flanged ends. The rod may be of a single lasing medium but also may consist of undoped ends and have a side cladding.

The Nd:YAG rod in FIG. 7 depicts evenly spaced grooves 80 that run the length of the rod. Alternately, the grooves may encircle the rod perpendicular to the length of the rod. Still another embodiment may include a crosshatched groove pattern to prevent parasitic oscillations from arising longitudinally and transversely. Grooves 80 are designed to have a spacing that will allow a maximum reflected angle that is less than the critical angle. The grooves may have a rectangular shape. Other shapes such as v-shaped grooves and cylindrical grooves are usable in this configuration as well. The sides of the grooves may be made diffuse to further prevent parasitic oscillations. A higher refractive index cladding layer may be applied between the grooves to trap stray radiation. A pattern of absorbing species may be placed in between the grooves, either within the lasing medium itself, or in a cladding that is located on the area outside of the rod between each groove. For example, Yb:YAG may be used as an absorbing species for Nd:YAG.

As an extension of the Nd:YAG rod described above, the invention is applicable to the compound Nd:YAG/sapphire rod depicted in FIG. 22A of WO 00/27000, which depicts a compound Nd:YAG rod that consists of a near-cylindrical Nd:YAG component 220 with two sapphire components 222 adhesive-free bonded to it. Induced stress birefringence may be observed between crossed polarizing films, resulting in linearly polarized laser radiation when inserted into a laser cavity and pumped with laser diode bars.

The invention is applicable to the compound Tm:YAG laser rod depicted in FIG. 22B of WO 00/27000, which illustrates an arrangement of a compound Tm:YAG laser rod with essentially elliptical cross section, consisting of a Tm:YAG section 224 to which two undoped YAG ends 226 are adhesive-free bonded. This compound of Tm:YAG and undoped YAG has two outer cladding layers of sapphire 228 bonded to it that impart the mechanically induced stress to the central YAG compound. The lens-like sapphire layers also may be employed to introduce pump radiation from laser diode bars to the laser rod. In addition, the near-elliptical cross section of the compound rod provides the advantage of eliminating parasitic oscillations, known as whispering gallery modes, which propagate along the circumference of laser rods with circular cross-sections.

The embodiment of FIG. 7 may be modified to utilize a generally tapered rod having a doped central rod portion and an undoped end cap diffusion bonded to each end. The use of undoped, flanged endcaps has proven useful in limiting the maximum length of the ray path that can be trapped in the laser rod. See U.S. Pat. No. 5,936,984, titled "Laser Rods With Undoped, Flanged End-Caps," by Helmuth Meissner et al., incorporated herein by reference.

The invention is applicable to the embodiment shown in FIG. 22C of WO 00/27000, which demonstrates another example within the wide range of useful laser rod architectures that can be engineered to emit linearly polarized laser output in accordance with that invention. A generally tapered 229 rod may include a compound core of undoped YAG 221/doped Yb:YAG 223 has two undoped YAG sides 225 and two sapphire layers 227 bonded to it, resulting in a birefringent YAG section of the rod.

The present invention may also be utilized in a microchip laser, which includes a doped host medium, e.g., an Nd:YAG lasing crystal. The microchip laser includes the groove architecture of the present invention and may further include grooves that traverse the slab perpendicular to its length. Still another embodiment may include a crosshatched groove pattern to prevent parasitic oscillations from arising longitudinally and transversely. The grooves are designed to have a spacing that will allow a maximum reflected angle that is less than the critical angle. The grooves are shown as having a rectangular shape; however, other shapes such as v-shaped grooves and cylindrical grooves are usable in this configuration as well. The sides of the grooves may be made diffuse to further prevent parasitic oscillations. A higher refractive index cladding layer may be applied between the grooves to trap stray radiation. A pattern of absorbing species may be in between the grooves, either within the lasing medium itself, or in a cladding that is located on the area outside of the rod between each groove. For an Nd:YAG microchip laser, Yb:YAG may be used as an absorbing species. By applying a higher refractive index cladding layer between the grooves, stray radiation will not be subject to TIR and will be trapped.

The invention is applicable to the microchip laser architectures such as, e.g., those described in WO 00/27000. FIG. 24A of WO 00/27000 shows a high-power passively q-switched compound Yb:YAG microchip laser consisting of undoped YAG ends 240, Yb:YAG as lasing crystal 242, $Cr^{4+}$:YAG 244 as saturable absorber, and sapphire sides 244. The propagation of the direction of the laser beam 245 is parallel to the sapphire cladding layers. FIG. 24B shows a simplified version, for relatively lower output power, where the lasing element Nd:YAG 246 is compounded with $Cr^{4+}$:YAG 248 as saturable absorber for passively q-switched operation. Sapphire sides 244 provide the stress birefringence in the YAG compound structure for linearly polarized laser output.

An embodiment of the invention was designed around a DILAS manufactured 808 nm laser diode array. The width of the diode array was measured. The laser diode array was imaged onto a CCD camera with a 10 cm focal length lens placed 40.5 cm from the diode array. The diode array image is 13.3 cm from the lens. Demagnification=13.3/40.5=0.328. The expected correction factor is therefore 1/0.328=3.05. The camera was thus used to measure the width of the diode arrays. On the camera, the diode width was 200 pixels. The camera pixel spacing was 16.7 $\mu$m. Thus, 200×16.7 $\mu$m=3.34 mm. Using a calibration factor of 10 mm/3.34 mm=2.99X. This is in agreement with the demagnification of the optical set up. The diode arrays were operated at 2 Hz, 100 $\mu$S, ~4 A.

FIG. 8 shows the laser diode array emitter and isolation spacings. The emitters 90 are separated by isolation spacings 92. As shown, the emitter width is 0.264 mm and the spacing width is 0.144 mm. The distance from the array edge 94 to the center 96 of first isolation space 92 is 0.336 mm. The center of one isolation space to center of an adjacent isolation space is 0.408 mm. In the diode array used in this example, there are 25 emitters.

Figure 10:
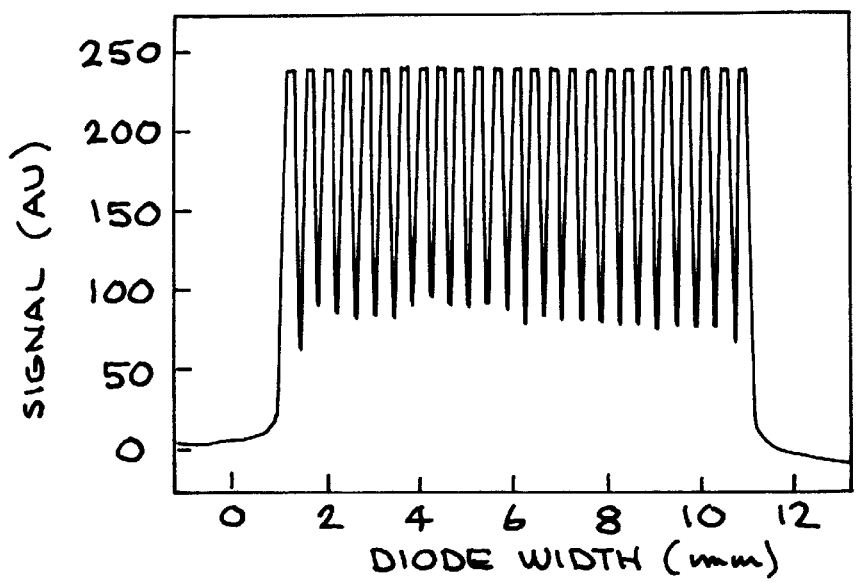

FIGS. 9 and 10 show the cross sections of two Dilas laser diode arrays. The drop in amplitude in diode #340 is due to a tilt in the set up; the output does appear to be uniform across the width of the diode. The cross sections were run slightly in saturation. Although the effect is slight, it will cause the isolation area widths to err on the short side. It is preferable that the isolation widths used in the design calculations are slightly wider then the actual values.

Figure 11:
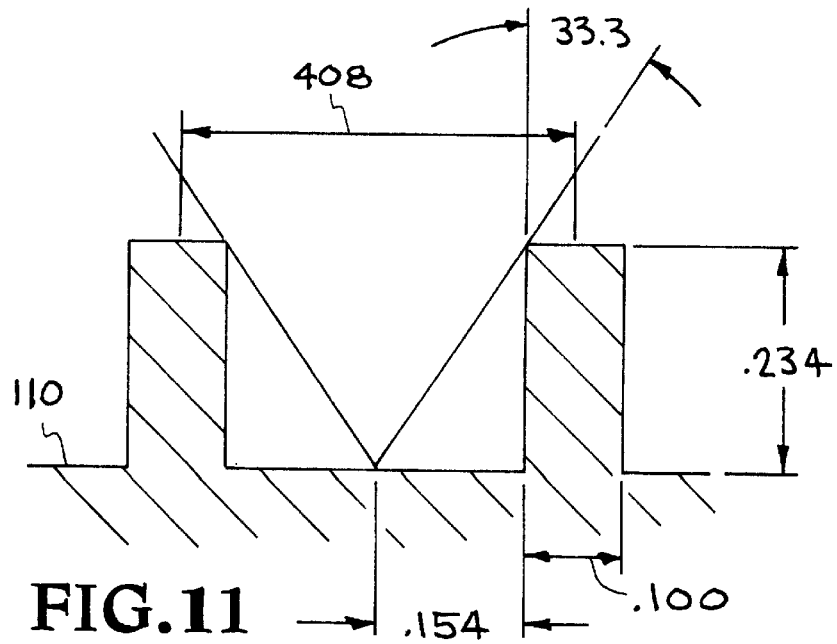
FIG. 11 illustrates design considerations for controlling parasitic modes for a laser diode array having a given emitter and isolation spacing.

FIG. 11 illustrates a design that will control parasitic modes for a laser diode array having the above described emitter and isolation spacing. This example illustrates the design considerations applicable to other laser configurations. Examples of other laser mediums to which this design is direcitly applicable include a zig-zag slab laser with undoped side claddings and a diode-pumped rod laser. Referring still to FIG. 11, for an Nd:YAG laser medium 110 having an index of refraction of 1.5 located in air having an index of refraction of 1.0, the critical angle is 41.8 degrees. Thus, as long as the maximum allowable angle of incidence of light within the lasing medium 110 with respect to the normal is less than the critical angle, no parasitic rays will find a closed path based on total internal reflection. With a diode coupling surface having a width W of 0.308 mm, an isolation spacing width K of 0.100 mm, an isolation spacing from center to center of 0.408 mm and an isolation depth D of 0.234, the maximum allowable angle of reflection from the diode coupling surface is 33.33 degrees. Since the maximum allowable angle of reflection (33.33 degrees) is less than the critical angle, no rays will be subject to total internal reflection, thereby eliminating the possibility of parasitic rays from establishing a closed path that could include the polished surface.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

We claim:

1. An optical amplifier, comprising:
   a solid-state laser waveguide gain medium;
   a laser diode bar comprising a plurality of laser diodes, wherein each laser diode of said plurality of laser diodes is separated from adjacent laser diodes by an isolation spacing; and
   a pattern of grooves in said gain medium, wherein each groove of said pattern of grooves is aligned with said isolation spacing and has a relative spacing, width and depth that will not allow internal reflections within said gain medium at angles equal to or greater than α critical angle.

2. The optical amplifier of claim 1, wherein each groove of said pattern of grooves comprises walls selected from the group consisting of walls with parallel sides, walls that form a V shape and walls that have a cylindrical radius of curvature.

3. The optical amplifier of claim 2, wherein said walls comprises a diffuse surface.

4. The optical amplifier of claim 1, further comprising an absorbing species diffused into said lasing medium between said grooves.

5. The optical amplifier of claim 1, further comprising a cladding deposited on the surface of said optical amplifier.

6. The optical amplifier of claim 1, further comprising a cladding deposited on the surface of said optical amplifier, wherein said cladding has a thickness that is at least equal to the depth of a groove of said pattern of grooves required to frustrate total internal reflections of a lasing medium of given refractive index.

7. The optical amplifier of claim 1, further comprising a first reflective surface placed at a first end of said medium, said optical amplifier further comprising a second reflective surface placed at a second end of said medium opposite to said first end, wherein said first reflective surface and said medium and said second reflective surface form a laser cavity.

8. The optical amplifier of claim 7, further comprising means for removing heat from said medium.

9. The optical amplifier of claim 8, wherein said optical amplifier functions as a laser oscillator.

10. The optical amplifier of claim 8, wherein said optical amplifier functions as a laser amplifier.

11. The optical amplifier of claim 1, wherein said solid-state laser waveguide gain medium is configured as a planar waveguide.

12. The optical amplifier of claim 11, wherein said planar waveguide is selected from the group consisting of an oscillator, an amplifier, a waveguide laser comprising a plurality of layers, a cladding pumped waveguide laser, a proximity side-pumped waveguide laser, a tapered waveguide laser, a waveguide laser with an unstable resonator design, a waveguide laser with side claddings of undoped laser host material, a waveguide with polished sides, a waveguide laser with canted sides, a waveguide laser having only the guiding layer polished and a waveguide laser having the guiding layer and at least one inner cladding layer polished.

13. The optical amplifier of claim 12, wherein said unstable resonator design is selected from the group consisting of a general resonator, a confocal resonator and an asymmetric resonator.

14. The optical amplifier of claim 12, wherein said unstable resonator comprises end surfaces having a shape selected from the group consisting of spherical, cylindrical and aspheric.

15. The optical amplifier of claim 1, wherein said solid-state laser waveguide gain medium is configured as a waveguide oscillator or amplifier having a cross section selected from the group consisting of a rectangular cross section, and a circular cross section.

16. The optical amplifier of claim 1, wherein said medium comprises polished sides.

17. The optical amplifier of claim 16, wherein said medium comprises side claddings of material selected from the group consisting of undoped laser host material and higher index of refraction material.

18. The optical amplifier of claim 16, wherein said medium comprises end caps of undoped laser host material.

19. The optical amplifier of claim 1, wherein said solid-state laser waveguide gain medium is configured as an amplifier plate.

20. The optical amplifier of claim 19, wherein said amplifier plate comprises a doped host material and a cladding of undoped host material.

21. The optical amplifier of claim 1, wherein said solid-state laser waveguide gain medium comprises doped host material and a cladding of undoped host material.

22. The optical amplifier of claim 21, wherein said doped host material comprises neodymium (Nd) doped into yttrium aluminum garnet (YAG).

23. A method for reducing parasitic oscillations in a solid-state laser waveguide gain medium, comprising:
   determining α critical angle for total internal reflection within the gain medium;
   forming grooves in said gain medium, wherein said grooves having a relative spacing, width and depth that will not allow internal reflections within the gain medium at angles equal to or greater than said critical angle; and
   providing a laser diode bar comprising a plurality of laser diodes, wherein each laser diode of said plurality of laser diodes is separated from adjacent laser diodes by an isolation spacing, wherein each groove of said pattern of grooves is aligned with said isolation spacing and has a relative spacing, width and depth that will not allow internal reflections within said gain medium at angles equal to or greater than the critical angle.

24. The method of claim 23, wherein the step of forming grooves includes forming groove walls selected from the group consisting of walls with parallel sides, walls that form a V shape and walls that have a cylindrical radius of curvature.

25. The method of claim 23, wherein the step of forming grooves includes forming groove walls, wherein at least one groove wall of said walls comprises a diffuse surface.

26. The method of claim 23, further comprising diffusing an absorbing species in a cladding layer bonded to said laser gain medium between said grooves.

27. The method of claim 23, wherein said laser gain medium comprises a doped host material, the method further comprising depositing a cladding on the surface of said laser gain medium between said grooves, wherein said cladding comprises an undoped host material.

* * * * *